US012200447B2

(12) United States Patent
Li et al.

(10) Patent No.: US 12,200,447 B2
(45) Date of Patent: Jan. 14, 2025

(54) ASSISTIVE LISTENING DEVICES

(71) Applicant: SHENZHEN SHOKZ CO., LTD., Guangdong (CN)

(72) Inventors: Bocheng Li, Shenzhen (CN); Bingyan Yan, Shenzhen (CN); Huifang Tang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 240 days.

(21) Appl. No.: 17/934,188

(22) Filed: Sep. 21, 2022

(65) Prior Publication Data

US 2023/0014930 A1 Jan. 19, 2023

Related U.S. Application Data

(63) Continuation of application No. PCT/CN2020/112326, filed on Aug. 29, 2020.

(51) Int. Cl.
*H04R 25/00* (2006.01)

(52) U.S. Cl.
CPC ........... *H04R 25/606* (2013.01); *H04R 25/50* (2013.01); *H04R 2430/03* (2013.01); *H04R 2460/13* (2013.01)

(58) Field of Classification Search
CPC .. H04R 25/606; H04R 25/50; H04R 2430/03; H04R 2460/13
See application file for complete search history.

(56) References Cited

U.S. PATENT DOCUMENTS

| | | | |
|---|---|---|---|
| 6,483,917 B1 | 11/2002 | Kang et al. |
| 10,609,496 B2 | 3/2020 | Liao et al. |
| 2008/0170732 A1 | 7/2008 | Nielsen |
| 2009/0046874 A1 | 2/2009 | Doman |
| 2014/0185819 A1 | 7/2014 | Gleissner |

(Continued)

FOREIGN PATENT DOCUMENTS

| | | |
|---|---|---|
| CN | 2452234 Y | 10/2001 |
| CN | 104159181 A | 11/2014 |

(Continued)

OTHER PUBLICATIONS

Notice of Rejection in Japanese Application No. 2022567823 mailed on Jan. 29, 2024, 14 pages.

(Continued)

*Primary Examiner* — Sunita Joshi
(74) *Attorney, Agent, or Firm* — METIS IP LLC

(57) ABSTRACT

The present disclosure discloses an assistive listening device. The assistive listening device includes a signal input module configured to receive an initial sound and convert the initial sound into an electric signal, a signal processing module configured to process the electric signal and generate a control signal, and at least one output energy converter configured to convert the control signal into a bone conduction sound wave that can be perceived by a user and an air conduction sound wave that can be heard by the user's ears. Within a target frequency range, the air conduction sound wave is transmitted to the user's ears, so that a sound intensity of the air conduction sound heard by the user's ears is greater than a sound intensity of the initial sound received by the signal input module.

19 Claims, 8 Drawing Sheets

10

(56) References Cited

U.S. PATENT DOCUMENTS

| | | | | |
|---|---|---|---|---|
| 2017/0164088 | A1 | 6/2017 | Fukuda | |
| 2017/0318372 | A1 | 11/2017 | Gerber et al. | |
| 2018/0199141 | A1* | 7/2018 | Rosenkranz | H04R 3/02 |
| 2019/0104352 | A1 | 4/2019 | Ozawa et al. | |
| 2020/0213780 | A1* | 7/2020 | Qi | G10K 9/13 |

FOREIGN PATENT DOCUMENTS

| | | | |
|---|---|---|---|
| CN | 104394492 | A | 3/2015 |
| CN | 105533986 | A | 5/2016 |
| CN | 107569236 | A | 1/2018 |
| CN | 209642968 | U | * 11/2019 |
| CN | 210327980 | U | 4/2020 |
| CN | 111148271 | A | 5/2020 |
| JP | H05244696 | A | 9/1993 |
| JP | 2006005625 | A | 1/2006 |
| JP | 2007189578 | A | 7/2007 |
| JP | 2013118497 | A | 6/2013 |
| JP | 2013232860 | A | 11/2013 |
| JP | 2019106657 | A | 6/2019 |
| KR | 20060043937 | A | 5/2006 |
| KR | 100643311 | 81 | 11/2006 |
| KR | 102039839 | 81 | 11/2019 |
| WO | 2005096664 | A1 | 10/2005 |

OTHER PUBLICATIONS

Office Action in Russian Application No. 2022126045 mailed on Mar. 21, 2023. 12 pages.

International Search Report in PCT/CN2020/112326 mailed on May 28, 2021, 7 pages.

Written Opinion in PCT/CN2020/112326 mailed on May 28, 2021, 6 pages.

First Office Action in Chinese Application No. 202010891010.4 mailed on Apr. 6, 2021, 23 pages.

First Examination Report in Indian Application No. 202217056916 mailed on Aug. 9, 2024, 7 pages.

* cited by examiner

ASSISTIVE LISTENING DEVICES

CROSS-REFERENCE TO RELATED APPLICATIONS

This application is a Continuation of International Application No. PCT/CN2020/112326, filed on Aug. 29, 2020, the entire contents of which are incorporated herein by reference.

TECHNICAL FIELD

The present disclosure relates to an acoustic field, in particular, relates to an assistive listening device.

BACKGROUND

An existing assistive listening device can provide hearing compensation for a user through bone conduction sound transmission or air conduction sound transmission. In some assistive listening devices (e.g., a hearing aid), the bone conduction sound transmission will cause insufficient vibration signal strength in some frequency bands due to an influence of the performance of a bone conduction vibrator, which results in an adequate effect of performing the hearing compensation through bone conduction. Moreover, for people with conductive hearing loss, a traditional air conduction hearing aid will have a large air conduction sound threshold difference in some frequency bands, thereby making it difficult to perform hearing compensation through air conduction, and when the user needs to hear a sound with a wide frequency range or a plurality of frequency bands, the above problems will lead to a poor listening experience for the user.

Therefore, it is desirable to provide an assistive listening device that combines bone conduction and air conduction for hearing compensation, improving a user's hearing compensation effect in a specific frequency band.

SUMMARY

According to one of the embodiments of the present disclosure, a assistive listening device is provided. The assistive listening device may include a signal input module configured to receive an initial sound and convert the initial sound into an electric signal, a signal processing module configured to process the electric signal and generate a control signal, and at least one output energy converter configured to convert the control signal into a bone conduction sound wave that can be perceived by a user and an air conduction sound wave that can be heard by the user's ears, wherein within a target frequency range, the air conduction sound wave is transmitted to the user's ears, so that a sound intensity of the air conduction sound heard by the user's ears is greater than a sound intensity of the initial sound received by the signal input module.

In some embodiments, the target frequency range is 200 Hz-8000 Hz.

In some embodiments, the target frequency range is 500 Hz-6000 Hz.

In some embodiments, the target frequency range is 750 Hz-1000 Hz.

In some embodiments, the signal processing module includes a signal processing unit, and the signal processing unit includes a frequency division module configured to decompose the electric signal into a high-frequency band component and a low-frequency band component, a high-frequency signal processing module coupled to the frequency division module and configured to generate a high-frequency output signal based on the high-frequency band component, and a low-frequency signal processing module coupled to the frequency division module and configured to generate a low-frequency output signal based on the low-frequency band component.

In some embodiments, the electric signal includes a high-frequency output signal corresponding to a high-frequency band component of the initial sound and a low-frequency output signal corresponding to a low-frequency band component of the initial sound. The signal processing unit includes a high-frequency signal processing module configured to generate the high-frequency output signal according to the high-frequency band component, and a low-frequency signal processing module configured to generate the low-frequency output signal according to the low-frequency band component.

In some embodiments, the signal processing module further includes a power amplifier configured to amplify the high-frequency output signal or the low-frequency output signal to generate the control signal.

In some embodiments, the output energy converter includes a first vibration component and a shell. The first vibration component is electrically connected to the signal processing module, and configured to receive the control signal and generate the bone conduction sound wave based on the control signal. The shell is coupled with the first vibration component and configured to generate, driven by the first vibration component, the air conduction sound wave.

In some embodiments, a connection between the shell and the first vibration component includes a rigid connection.

In some embodiments, the shell is connected to the first vibration component through an elastic component.

In some embodiments, the first vibration component includes a magnetic circuit configured to generate a first magnetic field, a vibration board connected to the shell, and a coil connected to the vibration board and electrically connected to the signal processing module, wherein the coil is configured to receive the control signal and generate a second magnetic field based on the control signal, and an interaction between the first magnetic field and the second magnetic field drives the vibration board to generate the bone conduction sound wave.

In some embodiments, the vibration board and the shell form a cavity, the magnetic circuit is located in the cavity, and the magnetic circuit is connected to the shell through the elastic component.

In some embodiments, a vibration output force level corresponding to the bone conduction sound wave is greater than 55 dB.

In some embodiments, the assistive listening device further includes at least one second vibration component configured to generate an extra air conduction sound wave, and the extra air conduction sound wave enhances the sound intensity of the air conduction sound heard by the user's ears within the target frequency range.

In some embodiments, the at least one second vibration component includes a vibration diaphragm structure connected to the shell, and the at least one output energy converter actuates the vibration diaphragm structure to generate the extra air conduction sound wave.

In some embodiments, the at least one second vibration component includes an air conduction loudspeaker configured to generate the extra air conduction sound wave according to the control signal.

In some embodiments, the assistive listening device further includes a fixed structure configured to support the assistive listening device, such that the assistive listening device is located at at least one of a mastoid, a temporal bone, a parietal bone, a frontal bone, an auricle, an ear canal, or a concha of the user's head.

According to one of the embodiments of the present disclosure, the assistive listening device is provided. The assistive listening device includes the signal input module configured to receive an initial sound and convert the initial sound into the electric signal, a signal processing module configured to process the electric signal and generate a control signal, and the at least one output energy converter configured to convert the control signal into the bone conduction sound wave that can be perceived by the user and the air conduction sound wave that can be heard by the user's ears. The assistive listening device includes a working state and a non-working state, the assistive listening device generates the air conduction sound wave when it is in the working state, the assistive listening device does not generate the air conduction sound wave when it is in the non-working state. Within the target frequency range, the sound intensity of the air conduction sound heard by the user's ears when the assistive listening device is in the working state is greater than the air conduction sound heard by the user's ears when the assistive listening device is in the non-working state.

BRIEF DESCRIPTION OF THE DRAWINGS

The present disclosure is further illustrated in terms of exemplary embodiments, and these exemplary embodiments are described in detail with reference to the drawings. These embodiments are not limiting. In these embodiments, the same number indicates the same structure, wherein.

DETAILED DESCRIPTION

Figure 1:
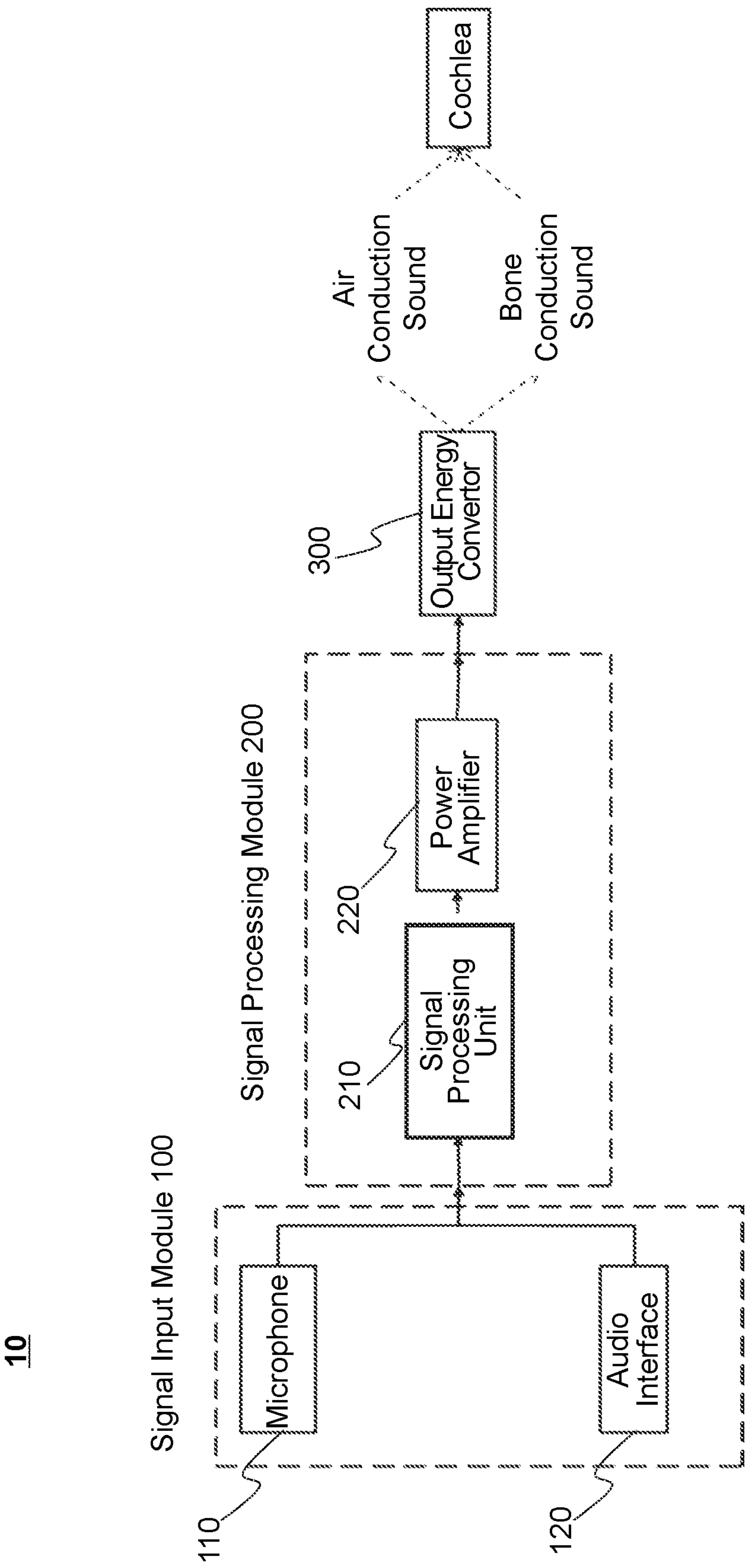
FIG. 1 is a block diagram illustrating an assistive listening device according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections or assemblies of different levels in ascending order. However, if other words may achieve the same purpose, the words may be replaced by other expressions.

As used in the disclosure and the appended claims, the singular forms "a," "an," and "the" include plural referents unless the content clearly dictates otherwise. Generally speaking, the terms "comprise" and "include" only imply that the clearly identified steps and elements are included, and these steps and elements may not constitute an exclusive list, and the method or device may further include other steps or elements.

In the field of hearing aid, an air conduction hearing aid or a bone conduction hearing aid is usually used for hearing compensation for people who have hearing loss. Traditional air conduction speakers can achieve hearing compensation by amplifying an air conduction sound signal. However, for people with conductive hearing loss, a threshold difference of air conduction sound in some frequency bands may be large, which makes it difficult to use air conduction sound for hearing compensation. Bone conduction hearing aids can achieve hearing compensation by converting a sound signal into a vibration signals (bone conduction sound). However, due to an influence of the performance of the bone conduction hearing aid, an intensity of the vibration signal generated in some frequency bands is insufficient, and it is difficult to achieve an ideal compensation effect, or if the bone conduction hearing aid produces excessive vibration in some frequency bands, it will bring an uncomfortable feeling to the user.

To improve the hearing compensation effect of an assistive listening device, the assistive listening device provided by the present disclosure simultaneously provides hearing compensation for the user through bone conduction and air conduction. In some embodiments, the assistive listening device may include a signal input module, a signal processing module, and at least one output energy converter. The signal input module may be configured to receive an initial sound and convert the initial sound into an electric signal. The signal processing module may be configured to process the electric signal and generate a control signal. The at least one output energy converter may be configured to convert the control signal into a bone conduction sound wave that can be perceived by a user and an air conduction sound wave that can be heard by the user's ears. Within a target frequency range (e.g., 200 Hz-8000 Hz), the air conduction sound wave may be transmitted to the user's ears, so that a sound intensity of the air conduction sound heard by the user's ears may be greater than a sound intensity of the initial sound received by the signal input module. In such cases, the air conduction sound wave generated by the assistive listening device may be superimposed with the bone conduction sound wave, which can increase a listening sound intensity perceived by the user's ears, thereby improving the hearing compensation effect of the assistive listening device.

In some embodiments, the above bone conduction sound wave and air conduction sound may be generated by a same output energy converter (e.g., a bone conduction vibration component). The conversion of the control signal into the air conduction sound wave that can be heard by the user's ears performed by the output energy converter may be understood as that a shell of the assistive listening device generates an air conduction sound wave driven by the output energy converter (also referred to as a sound leakage from the assistive listening device). In addition, one or more sound guide holes that meet certain conditions may be opened on the shell of the assistive listening device. The sound guide hole(s) may export the sound in the shell of the assistive listening device, and the exported sound may superimpose the sound leakage generated by the vibration of the shell to form the air conduction sound wave that can be heard by the user's ears.

In some embodiments, the assistive listening device may further include a bone conduction vibration component (also referred to as a first vibration component) and an air conduction vibration component (also referred to as a second vibration component). The above bone conduction sound wave and air conduction sound wave may be generated by the bone conduction vibration component and the air conduction vibration component, respectively. During use, the signal processing module may process an electric signal to generate the air conduction sound wave, and process an electric signal to generate bone conduction sound wave according to an actual situation to meet the different requirements for hearing compensation of different persons with hearing loss or the same person with hearing loss in different environments.

FIG. 1 is a block diagram of an assistive listening device according to some embodiments of the present disclosure. As shown in FIG. 1, an assistive listening device 10 may include a signal input module 100, a signal processing module 200, and at least one output energy converter 300.

The signal input module 100 may be configured to receive an initial sound and convert the initial sound into an electric signal. In some embodiments, the signal input module 100 may include a microphone 110 or/and an audio interface 120. In some embodiments, the microphone 110 may include an air conduction microphone, a bone conduction microphone, a remote microphone, and a digital microphone, etc., or any combination thereof. In some embodiments, a remote microphone may include a wired microphone, a wireless microphone, a broadcast microphone, etc., or any combination thereof. In some embodiments, the count of the microphone 110 may be one or more. When there are multiple microphones 110, these microphones 110 may be of the same type or different types. In some embodiments, the initial sound may include a sound transmitted from an external environment to the signal input module 100 through air conduction. For example, the microphone 110 may convert the collected air vibration into an analog signal (electric signal). The audio interface 120 may be configured to receive a digital or analog signal from the microphone 110. In some embodiments, the audio interface 120 may include an analog audio interface, a digital audio interface, a wired audio interface, and a wireless audio interface, etc., or any combination thereof. In some embodiments, the signal input module 100 may directly receive the electric signal transmitted in a wired or wireless manner. For example, the audio interface 120 may receive, from an external device in the wired or wireless manner, any digital or analog signal corresponding to a sound.

The signal processing module 200 may be configured to process the electric signal output by the signal pressing module 100 and generate a control signal. The control signal may be configured to control the output energy converter 300 to output bone conduction sound wave and/or air conduction sound wave. In the embodiments of the disclosure, the bone conduction sound wave refers to the sound wave in which a mechanical vibration is transmitted to the user's cochlea through bone conduction and is perceived by the user (also known as "bone conduction sound"), and the air conduction sound wave refers to the sound wave in which the mechanical vibration is transmitted to the user's cochlea through air conduction and is perceived by the user (also known as "air conduction sound").

In some embodiments, the signal processing module 200 may include a signal processing unit 210. The signal processing unit 210 may process a received electric signal. For example, the signal processing unit 210 may perform frequency-based processing on the electric signal to classify the electric signal according to its frequency band. For another example, the signal processing unit 210 may perform a noise reduction processing on the electric signal to remove noise in the electric signal (e.g., a portion of the electric signal corresponding to the noise received by the signal input module 100). In some embodiments, the signal processing module 200 may further include a power amplifier 200. The power amplifier 200 may amplify the received electric signal. In some embodiments, the order of the processing operation performed by the signal processing unit 210 and the processing operation performed by the power amplifier 220 may be not limited here. For example, in some embodiments, the signal processing unit 210 may first process the electric signal output by the signal input module 100 into one or more signals, and then the power amplifier 220 may amplify the one or more signals to generate the control signal. In some alternative embodiments, the power amplifier 220 may first amplify the electric signal output by the signal input module 100, and the signal processing unit 210 may then process the amplified electric signal to generate one or more control signals. In some embodiments, the signal processing unit 210 may be located between a plurality of power amplifiers 220. For example, the power amplifier 220 may include a first power amplifier and a second power amplifier, the signal processing unit 210 may be located between the first power amplifier and the second power amplifier. The first power amplifier may first amplify the electric signal output by the signal module 100, the signal processing unit 210 then processes the amplified electric signal to generate the one or more control signals, and the second power amplifier performs power method processing on the one or more control signals. In other embodiments, the signal processing module 200 may only include the signal processing unit 210 without including the power amplifier 220. More descriptions regarding the signal processing module 200 may be found elsewhere in the present disclosure (e.g., FIG. 2 and its relevant descriptions), which will not be repeated here.

At least one output energy converter 300 may be configured to convert the control signal generated by the signal processing module 200 into a bone conduction sound wave that can be perceived by the user and an air conduction sound wave that can be heard by the user's ears. In the present disclosure, the output energy converter may be a component configured to convert an electric signal into a vibration signal.

In some embodiments, the at least one output energy converter 300 may include a bone conduction vibration component. The bone conduction vibration component may fit the user's face to transmit the vibration signal to the cochlea through the skull. At the same time, the vibration signal may cause a vibration of the shell of the bone conduction vibration component to generate an air conduction sound wave that can be heard by the user's ears. In some embodiments, by designing a structure of the bone conduction vibration component and adjusting processing operations performed by different modules of the signal processing module 200 on the electric signal, the air conduction sound wave generated by the bone conduction vibration component may meet certain requirements, for example, within the target frequency range (e.g., 200 Hz-8000 Hz), the air conduction sound wave generated by the bone conduction vibration component may be transmitted to the user's ear (the cochlea), such that the sound intensity of the air conduction sound heard by the user when wearing the assistive listening device 10 may be greater than the sound intensity of an air conduction sound heard by the ear when not wearing the assistive listening device 10. That is, while generating the bone conduction sound wave, the bone conduction vibration component also amplifies the air conduction sound heard by the user, thereby realizing the hearing compensation for the user in a manner of bone conduction and air conduction at the same time. It should be noted when the user wears the assistive listening device 10, the assistive listening device 10 may be regarded as being in a working state; when the user does not wear the assistive listening device 10, the assistive listening device 10 may be regarded as being in a non-working state. More descriptions regarding the working state and the non-working state may be found in FIG. 5 and its relevant descriptions in the present disclosure, which will not be repeated here.

In some embodiments, the at least one output energy converter 300 may include a bone conduction vibration component and an air conduction vibration component. The air conduction vibration component may convert the control signal generated by the signal processing module 200 into an extra air conduction sound wave, and further perform hearing compensation for the user in a manner of air conduction. More descriptions regarding the output energy converter 300 may be found elsewhere in the present disclosure (e.g., FIG. 5 and its relevant descriptions), which will not be repeated here.

Figure 2:
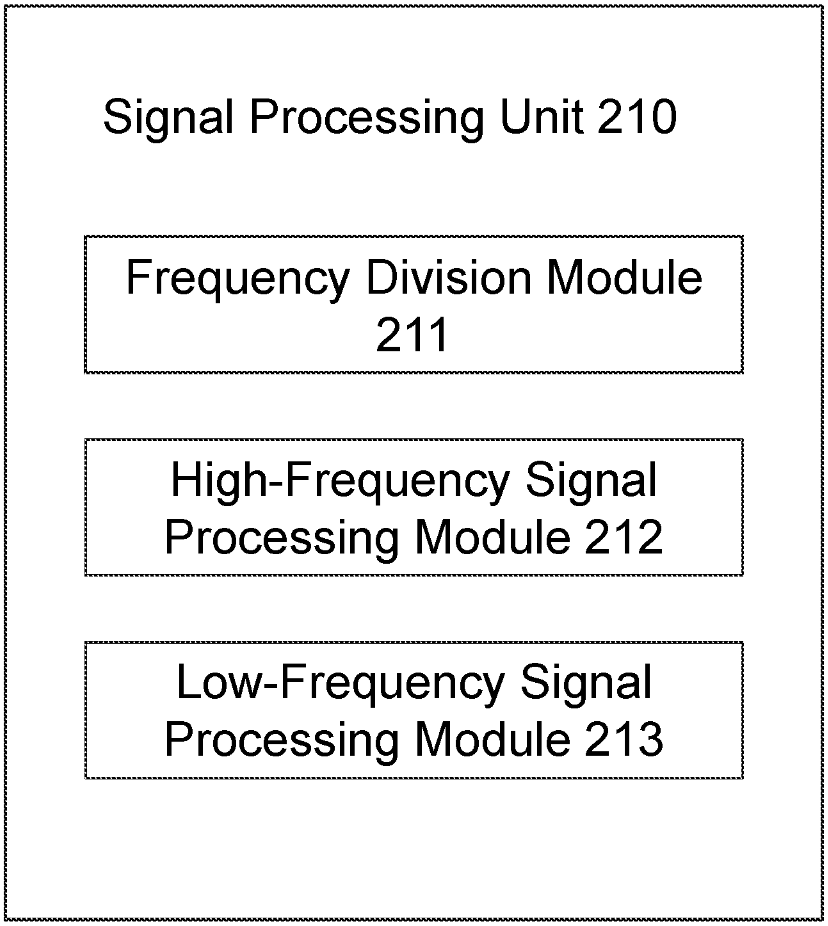
FIG. 2 is a block diagram illustrating a signal processing unit according to some embodiments of the present disclosure.

FIG. 2 may be a block diagram of a signal processing unit according to some embodiments of the present disclosure. As shown in FIG. 2, in some embodiments, the signal processing unit 210 may include a frequency division module 211, a high-frequency signal processing module 212, and a low-frequency signal processing module 213. The frequency division module 211 may directly decompose the electric signal into different frequency band components corresponding to the electric signal, for example, the frequency division module 211 may decompose the initial sound into a high-frequency component and a low-frequency component. The high-frequency signal processing module 212 may be coupled to the frequency division module 211 and configured to generate a high-frequency output signal (a high-frequency electric signal) based on the high-frequency band component. The low-frequency signal processing module 213 may be coupled to the frequency division module 211 and configured to generate a low-frequency output signal (a low-frequency electric signal) based on the low-frequency band component. In the embodiments of the present disclosure, the high-frequency component may refer to a high-frequency electric signal, and the low-frequency component may refer to a low-frequency electric signal. The high-frequency signal processing module 212 may process or adjust the high-frequency electric signal, and the low-frequency signal processing module 213 may process the low-frequency electric signal. In some embodiments, the high-frequency signal processing module 212 and the low-frequency signal processing module 213 may include an equalizer, a dynamic range controller, or a phase processor, etc. It should be noted that, in other embodiments, the assistive listening device may merely include the frequency division module 211, and whether the high-frequency signal processing module 212 and the low-frequency signal processing module 213 need to be installed or not may be determined according to the actual situation. In the embodiments of the present disclosure, a low-frequency may refer to a frequency band generally from 20 Hz to 150 Hz, a middle frequency may refer to a frequency band generally from 150 Hz to 5 kHz, and a high-frequency band may refer to a frequency range generally from 5 kHz to 20 Hz, a mid-low-frequency may refer to a frequency band generally from 150 Hz to 500 Hz, and a mid-high-frequency refers to a frequency band generally from 500 Hz to 5 kHz. It should be noted that the above frequency bands are merely for example to give approximate intervals. The definitions of the above frequency bands may be changed with different industries, different application scenarios, and different classification standards. For example, in other application scenarios, the low-frequency refers to a frequency band generally from 20 Hz to 80 Hz, the mid-low-frequency may refer to a frequency band generally from 80 Hz-160 Hz, the mid-frequency may refer to a frequency band generally from 160 Hz to 1280 Hz, and the mid-high-frequency may refer to a frequency band generally from 1280 Hz to 2560 Hz, and the high-frequency band may refer to a frequency band generally from 2560 Hz to 20 kHz.

In some embodiments, the frequency division module 211 may directly decompose the electric signal into a plurality of frequency components corresponding to a plurality of frequency bands, and at the same time, the signal processing unit 210 may include a plurality of signal processing units corresponding to the plurality of frequency bands to obtain the frequency components corresponding to the plurality of frequency bands. For example, the frequency division module 211 may decompose the electric signal into one or more of a low-frequency band component, a middle frequency band component, and a high-frequency band component, or decompose the initial sound into a mid-low-frequency component and a mid-high-frequency component, etc.

In some embodiments, the signal processing module 200 may merely include the frequency division module 211, and the frequency division module 211 may perform a frequency division processing on the electric signal output by the signal input module 100 to obtain an electric signal of each frequency band (e.g., a low-frequency electric signal, a high-frequency electric signal), and the electric signals are directly output to the power amplifier for amplification.

It should be known that the division method on the electric signal by the frequency division module 211 may be performed according to the actual situation or user's setting, and is not limited to the above manner. In some embodiments, the frequency division module may include a plurality of filters/filter banks to process the electric signal to output the control signal including different frequency components, thereby respectively controlling the output of the air conduction sound or the bone conduction sound. In some embodiments, the filters/filter banks include but are not limited to, analog filters, digital filters, passive filters, and active filters, etc.

In some embodiments, the signal input module 100 may perform the frequency division processing on the initial sound in advance. For example, the signal input module 100 may include a high-frequency microphone and a low-frequency microphone. The high-frequency microphone may receive a high-frequency sound in the initial sound and convert the high-frequency sound into the high-frequency component, and the low-frequency microphone may receive a low-frequency sound in the initial sound and convert the low-frequency sound into the low-frequency component, such that the frequency division processing may be completed before the electric signal is transmitted to the signal processing module 200. In some embodiments, the signal processing unit 210 may further include a high frequency signal processing module and a low frequency signal processing module directly coupled with the signal input module 100. The high frequency signal processing module may generate a high-frequency output signal according to the high-frequency frequency component, and the low frequency signal processing module may generate a low-frequency output signal according to the low-frequency component.

In some embodiments, the signal processing unit 210 may only include a full-frequency signal processing module, and there is no need to perform the frequency division processing on the electric signal input by the signal input module 100. That is, the frequency division module 211, the high-frequency signal processing module 212, and the low-frequency signal processing module 213 may be replaced by the full-frequency signal processing module. The full-frequency signal processing module may include an equalizer, a dynamic range controller, a phase processor, etc. The equalizer may be configured to individually perform a gain operation or an attenuation operation on the electric signal according to a specific frequency band. The dynamic range controller may be configured to compress and amplify the electric signal, for example, to make the sound sounds softer or louder. The phase processor may be configured to adjust the phase of the electric signal. In some embodiments, the electric signal may be processed into an output signal via the equalizer, the dynamic range controller, and the phase processors. For example, in some scenarios, the user's ear may be more sensitive to the air conduction sound within some frequency ranges (e.g., the low frequency range, the mid-low frequency range, or the high frequency range), and the full-frequency signal processing module may enhance the electric signal within the frequency range, such that the output energy converter 300 outputs a more intense air conduction sound within these frequency ranges. In other scenarios, the low-frequency bone conduction sound wave with a strong intensity may bring an uncomfortable feeling to the user, and the full-frequency signal processing module may be configured to attenuate the low-frequency electric signal to alleviate the uncomfortable feeling. Optionally, the full-frequency signal processing module may further appropriately enhance the electric signal within other frequency ranges other than the low-frequency range to compensate for the attenuated low-frequency electric signal, which prevents the user from hearing a reduction in an overall sound intensity.

In some embodiments, the signal processing module 200 may further include one or more power amplifier 220. The power amplifier(s) 220 may amplify and generate the control signal based on the electric signal output by the signal input module 100 or the electric signal processed by the signal processing unit 210 (e.g., the high-frequency output signal or the low-frequency output signal). In some embodiments, the signal processing module 200 may include two power amplifiers 220. For example, the power amplifier may include a first power amplifier configured to amplify the high frequency output signal into a corresponding control signal, and a second power amplifier configured to amplify the low frequency output signal into the corresponding control signal. In some embodiments, when the frequency division module 211 may decompose the electric signal into frequency components corresponding to the plurality of frequency bands, the signal processing module 200 may include a plurality of power amplifiers 220 to respectively amplify the output signals of the frequency components corresponding to the plurality of frequency bands into the control signals. In some embodiments, a power amplifier may further be configured to cooperate with the above full-frequency signal processing module to selectively amplify the sound within a specific frequency range in the initial sound, and finally transmit it to the user as the bone conduction sound wave and the air conduction sound wave.

Through the above signal processing module 200, the hearing compensation effect of the assistive listening device may be enhanced. Merely by way of example, when the assistive listening device is a bone conduction hearing aid, the assistive listening device may use the output energy converter (for example, a vibration loudspeaker) to output full-frequency vibration or bone conduction sound, so that the user can hear sound in a manner of bone conduction. In some cases, the bone conduction hearing aid may have a better sound compensation within the specific frequency range (e.g., 200 Hz-8000 Hz). In some embodiments, to further highlight the sound compensation effect of the assistive listening device within the specific frequency range, the electric signal within the specific frequency range may be amplified. In some embodiments, the electric signal outside the specified range (e.g., 20 Hz-200 Hz, 8000 Hz-20 kHz) may be amplified, in this way, the assistive listening device may have a good sound compensation effect within the specific range, while ensuring the sound compensation effect of the other frequency bands, so that the sound compensation effect of the assistive listening device has a better balance within a full frequency band, and an experience feeling of the user may be improved. In some embodiments, the output energy converter of the assistive listening device may generate a corresponding air conduction sound wave while emitting the bone conduction sound wave. The air conduction sound wave may be used as sound compensation in addition to the bone conduction sound wave in the assistive listening device. By amplifying the electric signal within a specific frequency band, the air conduction sound wave may be provided and the bone conduction sound wave compensation within the frequency band may be improved, thereby further improving the sound compensation effect of the assistive listening device. It should be noted that the above frequency range selected by a power amplifier is merely provided as exemplary description, and those skilled in the art may adjust the frequency range corresponding to the power amplifier according to an actual application situation, which is not further limited here.

It should be noted that the signal processing unit 210 may not perform a frequency division processing, which means that the frequency division module 211, the high frequency signal processing module 212, and the low frequency signal processing module 213 may be omitted from the signal processing unit 210. In some embodiments, the signal processing unit 210 may process the electric signal based on a time-frequency, a frequency domain, or a sub-band of the electric signal. In some embodiments, the signal processing unit 210 may include an equalizer, a dynamic range controller, a phase processor, a nonlinear processor, etc. The equalizer may be configured to individually perform a gain operation or an attenuation operation on the electric signal according to the specific frequency band. The dynamic range controller may be configured to compress and amplify the electric signal, for example, to make the sound sounds softer or louder. The phase processor may be configured to adjust the phase of the electric signal. The nonlinear processor may be configured to reduce noises in the electric signal. In some embodiments, the electric signal may be processed into an output signal via the equalizer, the dynamic range controller, the phase processor, and the nonlinear processor.

Figure 3:
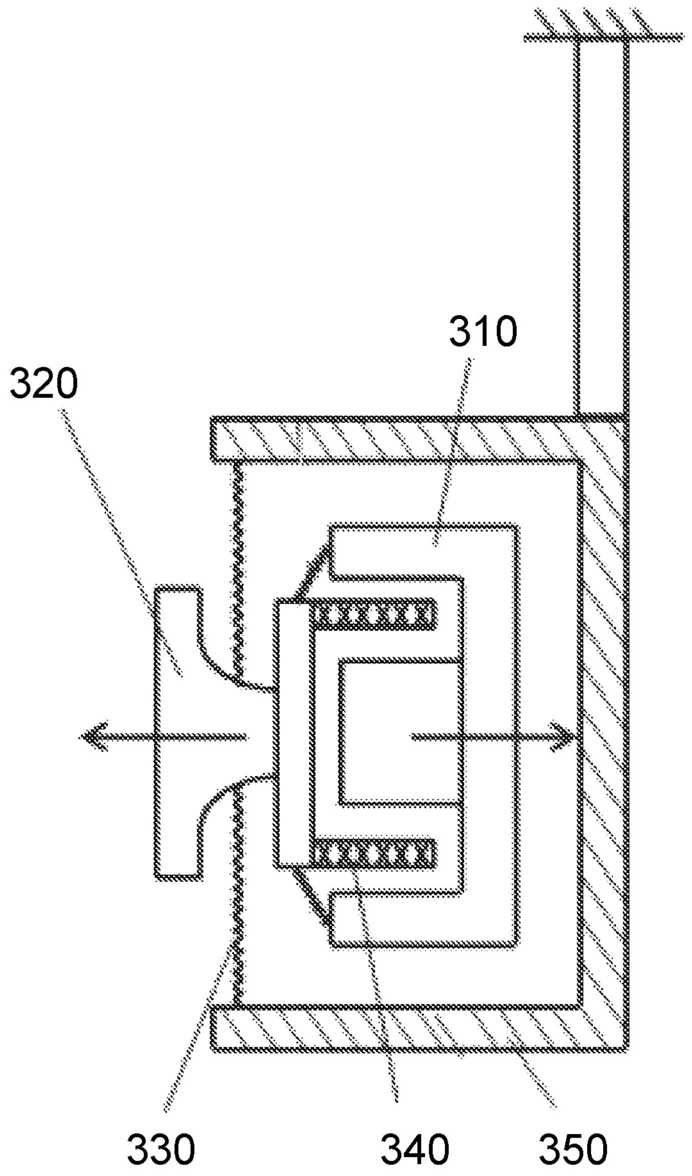
FIG. 3 is a structure schematic diagram illustrating an output energy converter according to some embodiments of the present disclosure.

FIG. 3 may be a structure schematic diagram of an output energy converter according to some embodiments of the present disclosure As shown in FIG. 3, the output energy converter may include a first vibration component and a shell 350. The first vibration component may be electrically connected to the signal processing module 200 to receive the control signal, and generate the bone conduction sound wave based on the control signal. Specifically, the first vibration component may have mechanical vibration according to the control signal, and the mechanical vibration may generate the bone conduction sound wave. For example, the first vibration component may be any element (e.g., a vibration motor, an electromagnetic vibration device, etc.) that converts the electric signal (e.g., the control signal from the signal processing module 200) into a mechanical vibration signal, and the signal conversion method may include but be not limited to an electromagnetic form (using a moving coil, a moving iron, and a magnetostrictive type), a piezoelectric form, an electrostatic form, etc. The structure inside the first vibration component may be a single resonance system or a composite resonance system. When the user wears the assistive listening device, a partial structure of the first vibration component may fit (or contact with) the user's head skin to transmit the bone conduction sound wave to the cochlea through the skull. The shell 350 may be coupled with the first vibration component and configured to generate the air conduction sound wave driven by the first vibration component.

In some embodiments, the shell 350 may be connected to the first vibration component through a connector 330. In some embodiments, a response of the shell 350 to the first vibration component may be adjusted by adjusting the connector 330 between the shell 350 and the first vibration component, i.e., adjusting the air conduction sound wave generation effect of the shell 350 by adjusting the connector 330. In some embodiments, the connector 330 may be rigid or flexible. When the connector 330 is rigid, a connection between the shell 350 and the first vibration component may be a rigid connection. In other embodiments, the connector 330 may be an elastic component, such as a spring or an elastic sheet.

In some embodiments, the first vibration component may include a magnetic circuit 310, a vibration board 320, and a coil 340. The magnetic circuit 310 may be configured to generate a first magnetic field, the vibration board 320 may be connected to the shell, and the coil 340 may be connected to the vibration board and electrically connected to the signal processing module 200. Specifically, the coil 340 may receive the control signal generated by the signal processing module 200 and generate a second magnetic field based on the control signal, and through an interaction between the first magnetic field and the second magnetic field, the coil 340 will be subjected to a force F to drive the vibration board 320 to generate the bone conduction sound wave on the user's face. Besides, the vibration of the vibration board 320 may drive the shell 350 to vibrate, thereby generating the air conduction sound wave. Specifically, within the mid-low frequency band, a vibration amplitude of the shell 350 may be greater than or equal to the vibration amplitude of the vibration board 320. Since the shell 350 does not contract the skin, the vibration of the shell 350 cannot transmit the sound through the bone conduction, however, the vibration of the shell 350 may generate the air conduction sound wave and transmit the air conduction sound wave to the eardrum through an external auditory canal path, such that the user can hear the sound, thereby increasing the sound compensation effect. At the same time, since the vibration sense of the shell 350 within the mid-low frequency band may be stronger than the vibration sense of the vibration board 320, the vibration amplitude of the vibration board 320 here may be small, which can effectively reduce the vibration sense when the user uses the assistive listening device, thereby improving comfort. Within a higher frequency band, the vibration amplitude of the vibration board 320 may be significantly greater than the vibration amplitude of the shell 350, so that the first vibration component can effectively transmit the sound through the vibration of the vibration board 320 in a manner of bone conduction. At the same time, the vibration amplitude of the shell 350 may be much smaller than the vibration amplitude of the vibration board 320, which can effectively reduce the sound leakage of the shell 350 within the higher frequency band. In some embodiments, the frequency range and the amplitude of the sound transmitted through the air conduction or the bone conduction may be adjusted by adjusting the mass and elastic coefficient of each part of the first vibration component.

In some embodiments, the vibration board 320 and the shell 350 may form a cavity, the magnetic circuit 310 may be located in the cavity, and the magnetic circuit 310 may be connected to the shell 350 through the connector 330 or another elastic component (not illustrated in FIG. 3), and the interaction between the vibration board 320 and the coil 340 drives the magnetic circuit system 310 to further generate a corresponding vibration. The vibration of the magnetic circuit system 310 relative to the shell 350 will drive the air in the cavity to vibrate. In some embodiments, one or more sound guide holes are opened on the shell 350, so that the air in the cavity may be derived from the shell 350, and superimposed with the sound generated by the vibration of the shell 350 to jointly form the air conduction sound wave that can be heard by the user's ears. The number, position, shape, and/or size of the sound guide holes on the shell 350 need to meet certain conditions, so that the sound derived from the sound guide holes and the sound generated by the vibration of the shell 350 interfere with each other at the user's ear, thereby further enhancing the air conduction sound that can be heard by the user.

It may be seen from FIG. 3 and its relevant descriptions that the bone conduction sound wave may be generated by the vibration board 320 of the output energy converter 300, and the air conduction sound wave may be generated by the shell 350 (or the sound guide holes on the shell 350). In some embodiments, the control signal may include different frequency components, and the vibration generated by the vibration board 320 based on the control signal may include vibrations of different frequencies. Therefore, the bone conduction sound wave and the air conduction sound wave emitted by the assistive listening device may cover different frequency ranges, so that the assistive listening device can provide a certain sound compensation effect within different frequency ranges.

It should be known that since the vibrating board 320 and the shell 350 have different degrees of response to the vibrations of different frequencies, the sound compensation effect provided by the bone conduction sound wave and the air conduction sound wave generated by the vibration board 320 and the shell 350 at different frequencies are also different. Taking the air conduction sound wave as an example, the vibration of the shell 350 may amplify the sound intensity of the air conduction sound heard by the user within a target frequency range, i.e., within the target frequency range, the air conduction sound wave generated by the vibration of the shell 350 may be transmitted to the user's ear, so that the sound intensity of the air conduction sound heard by the user's ear may be stronger than the sound intensity of the initial sound received by the signal input module. The target frequency range may be related to the structure of the housing 350 and the processing method used by the signal processing module 200 in processing the electric signal. In some embodiments, the target frequency range may be within 200 Hz-8000 Hz, 500 Hz-6000 Hz, 750 Hz-1000 Hz, or any other frequency range. It may be considered that the assistive listening device has a better sound compensation effect within the target frequency range. In some specific scenarios, the control signal corresponding to the target frequency range may be amplified in the signal processing module 200, thereby further improving the sound compensation effect within the target frequency range. In other application scenarios, for example, when the frequency range of the sound received by the user is greater than the target frequency range, since the sound compensation effect of the assistive listening device may be more obvious within the target frequency range, the control signal outside the target frequency range may be amplified more at this time, thereby balancing a hearing effect of the user in each frequency band, meanwhile reducing an energy consumption of the assistive listening device, and guaranteeing a use time of the assistive listening device.

For example, when amplifying the high-frequency electric signal and the low-frequency electric signal, the amplification degrees of the high-frequency electric signal and the low-frequency band electric signal may be the same or different. For example, under the premise that a high-frequency sound compensation effect of the assistive listening device is better than a low-frequency sound compensation effect, the low-frequency electric signal may be amplified, i.e., the low-frequency output signal may be stronger than the high-frequency output signal, thereby ensuring that the assistive listening device has a relatively balanced sound compensation effect within the full frequency band. For another example, under the premise that the high-frequency sound compensation effect of the assistive listening device is better than the low-frequency sound compensation effect, to further highlight the hearing effect of the assistive listening device under the high-frequency output signal, an amplification degree of the high-frequency electric signal may be greater than the amplification degree of the low-frequency signal. In some embodiments, the same degree of amplification may be performed on different components of the electric signal within the full frequency band. It should be noted that, in some embodiments, the high frequency output signal or the low frequency output signal may be determined relative to a target frequency. For example, when the target frequency range is within 20 Hz-1000 Hz, the low frequency may be the frequency band within 20 Hz-100 Hz, 20 Hz-150 Hz, 20 Hz-200 Hz, etc., and the high frequency may be the frequency band within 900 Hz-1000 Hz, 850 Hz-1000 Hz, 800 Hz-1000 Hz, etc. In some embodiments, the high frequency output signal and the low frequency output signal may be determined relative to the full-band frequency as described elsewhere in the present disclosure. In addition, the high-frequency output signal and the low-frequency output signal here are comparative terms, and those skilled in the art may make adjustments according to an actual application scenario, which is not further limited here.

To further illustrate the hearing effect of the assistive listening device within a certain frequency range (e.g., 200 Hz-8000 Hz), the following descriptions are provided with a combination of test results of the bone conduction component of the assistive listening device and the test results of the air conduction component of the assistive listening device.

Figure 4:
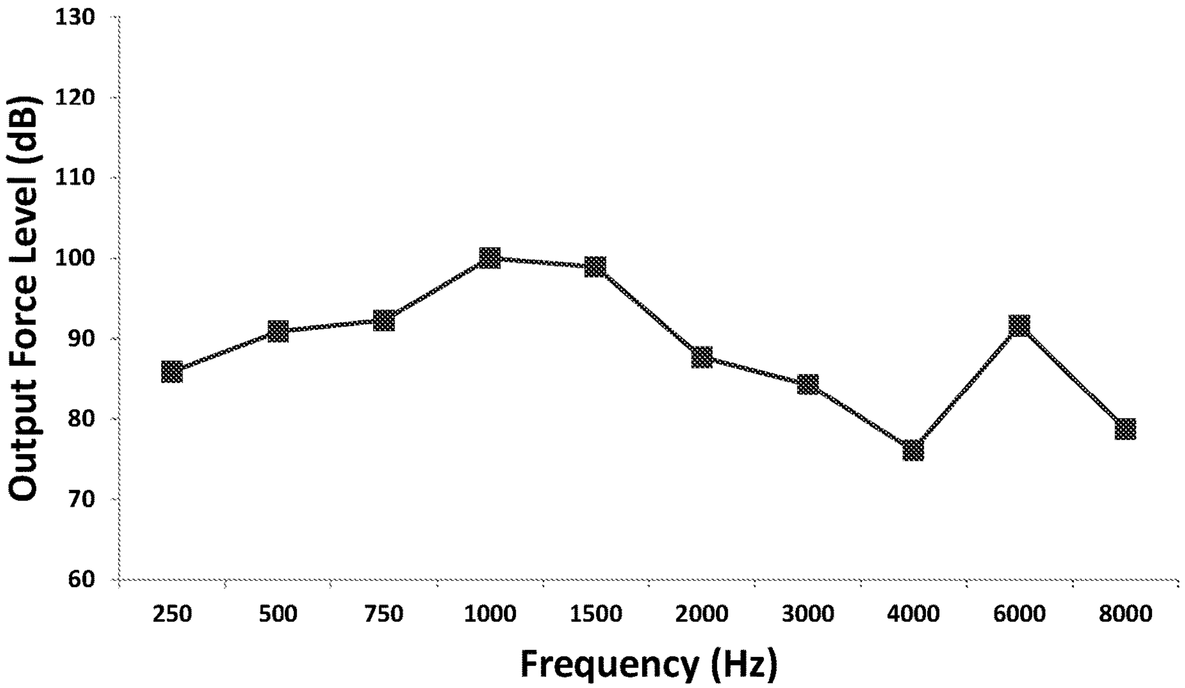
FIG. 4 is a frequency response curve of a maximum output force level ($OFL_{60}$) of a bone conduction component output by an assistive listening device in a reference sound environment according to some embodiments of the present disclosure.

FIG. 4 is a frequency response curve of a maximum output force level ($OFL_{60}$) of a bone conduction component output by an assistive listening device in a reference sound environment according to some embodiments of the present disclosure. In the embodiments of the present disclosure, a reference environment may refer to a sound intensity value (also referred to as a reference sound pressure level) received by the ear simulator of an artificial head when the assistive listening device is in a non-working state. $OFL_{60}$ refers to the output force level of the assistive listening device under a condition that the reference sound pressure level is 60 dB. For the convenience of descriptions, the sound intensity value corresponding to the reference environment in the embodiments of the present disclosure is set to 60 dB. It can be seen from FIG. 4 that when the sound intensity of the reference environment is 60 dB and when the target frequency range is within 250 Hz-8000 Hz, a vibration force level of the bone conduction component output by the assistive listening device is all above 76 dB. When the target frequency range is within 250 Hz-2000 Hz, the vibration force level of the bone conduction component output by the assistive listening device is all above 85 dB. When the target frequency range is within 500 Hz-1500 Hz, the vibration force level of the bone conduction component output by the assistive listening device is all above 90 dB. When the target frequency range is within 750 Hz-1500 Hz, the vibration force level of the bone conduction component output by the assistive listening device is all above 92 dB. In some embodiments, for the sound with a certain reference sound pressure levels (for example, 60 dB), since the vibration force levels of the bone conduction components of different frequencies are different, the signal processing module 200 may amplify the components of the electric signal in different frequencies to different degrees. For example, since the vibration force level of the bone conduction component with a range of 1000 Hz-1500 Hz exceeds the vibration force level of other ranges, to further improve the bone conduction sound compensation effect of the assistive listening device, the signal processing module 200 may amplify the frequency component within the range of 1000 Hz-1500 Hz to a greater degree. Since the vibration force level of the bone conduction component around 4000 Hz is smaller than the vibration force level of other ranges, to balance the compensation effect of the bone conduction sound of the assistive listening device within each frequency range, the signal processing module 200 may amplify the frequency band component around the 4000 Hz to a greater degree.

Figure 5:
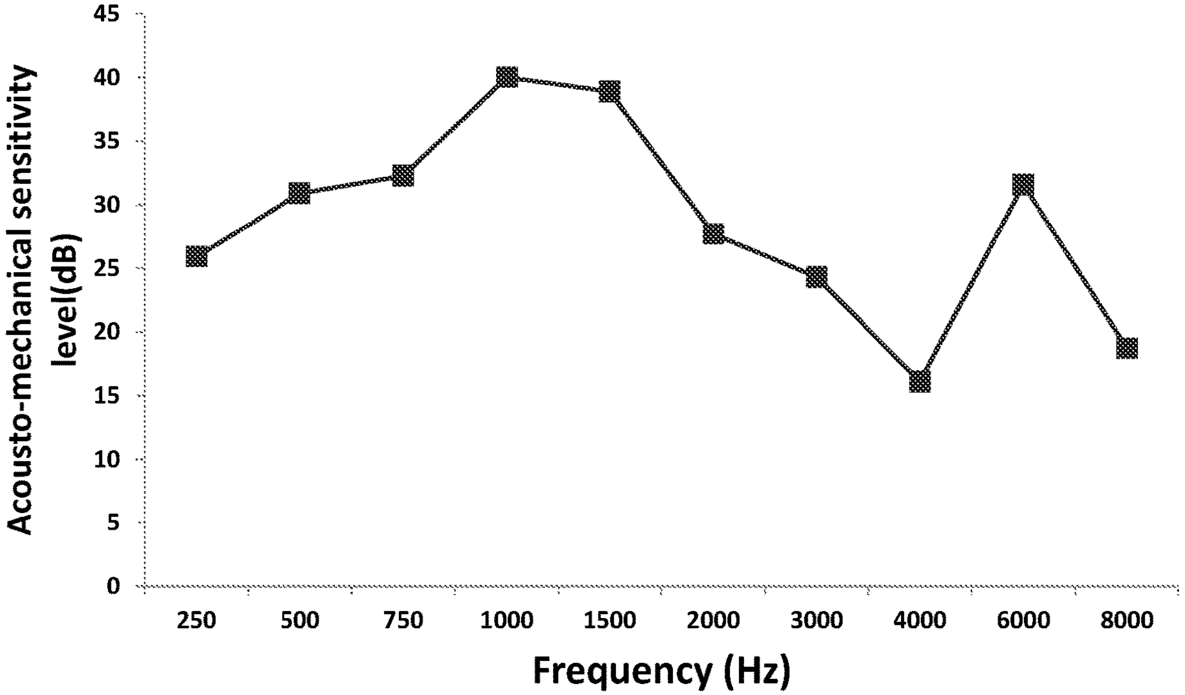
FIG. 5 is a frequency response curve of a maximum AMSL of a bone conduction component output by an assistive listening device in a reference sound environment according to some embodiments of the present disclosure.

FIG. 5 is a frequency response curve of a maximum acousto-mechanical sensitivity level (AMSL) of a bone conduction component output by an assistive listening device in a reference sound environment according to some embodiments of the present disclosure. In the embodiments of the present disclosure, an acousto-mechanical sensitivity level may refer to a difference between the output force level and the reference sound pressure level, for example, the difference between the $OFL_{60}$ and the reference sound pressure level (e.g., 60 dB). It can be seen from FIG. 5 that when the reference sound pressure level of the assistive listening device is 60 dB and when the frequency range is within 250 Hz-8000 Hz, the acousto-mechanical sensitivity level of the bone conduction component is all above 15 dB. When the frequency range is within 250 Hz-2000 Hz, the acousto-mechanical sensitivity level of the bone conduction component is all above 25 dB. When the frequency range is within 500 Hz-1500 Hz, the acousto-mechanical sensitivity level of the bone conduction component is all above 25 dB. When the frequency range is within 750 Hz-1000 Hz, the acousto-mechanical sensitivity level of the bone conduction component is all above 32 dB. In some embodiments, for the sound with a certain reference sound pressure level (for example, 60 dB), since the acousto-mechanical sensitivity levels of the bone conduction component of the different frequencies (or different frequency bands) are different, the signal processing module 200 may amplify different components of the electric signal of different frequencies to different degrees. For example, since the acousto-mechanical sensitivity level of the bone conduction component within the range of 1000 Hz-1500 Hz exceeds the acousto-mechanical sensitivity levels of the other ranges, to further improve the bone conduction sound compensation effect of the assistive listening device, the signal processing module 200 may amplify the frequency component within the 1000 Hz-1500 Hz to a greater degree. Since the acousto-mechanical sensitivity level of the bone conduction component around 8000 Hz is smaller than the acousto-mechanical sensitivity levels of the other ranges, to balance the compensation effect of the bone conduction sound of the assistive listening device within each frequency range, the signal processing module 200 may amplify the frequency band component around the 8000 Hz to a greater degree.

It should be noted that the sound intensity value corresponding to the reference environment in the embodiments of the present disclosure is not limited to 60 dB, and the sound intensity value corresponding to the reference environment set to 60 dB here is merely provided for illustration purposes, in other embodiments, the sound intensity value corresponding to the reference environment may be adaptively adjusted according to the actual situation, which is not further limited here.

In some embodiments, the output of the air conduction component of the assistive listening device may be tested by using the artificial head with the ear simulator. The ear simulator only tests the output of the air conduction component. When testing the output of the air conduction component, a single frequency sound (e.g., 250 Hz, 500 Hz, 750 Hz, 1000 Hz, 1500 Hz, 2000 Hz, 3000 Hz, 4000 Hz, 6000 Hz, 8000 Hz) at a specific sound pressure level (e.g., the reference sound pressure level 60 dB) may be used as a test sound source. During the process of the test, the artificial head with the ear simulator may be placed at a test point without wearing the assistive listening device, and then the test sound source is turned on to obtain the sound pressure level (the output of the air conduction component) tested by the ear simulator in this situation, which can also be referred to as a "non-working state" sound pressure level. Besides, the assistive listening device may be placed on the artificial head according to an actual wearing method, when the test sound source is turned on, the sound pressure level tested by the ear simulator may be obtained, which can be referred to as a "working state" sound pressure. The gain of the air conduction component of the assistive listening device may be the difference between the "working state" sound pressure level and the "non-working state" sound pressure level. In some embodiments, the test point can be selected at a distance of 1.5 m from the front of the test sound source, while the artificial head face is facing the test sound source. It should be noted that the above method for testing the air conduction sound pressure of the assistive listening device is merely provided for illustration purposes, and those skilled in the art can adjust the experimental method according to the actual situation.

Figure 6:
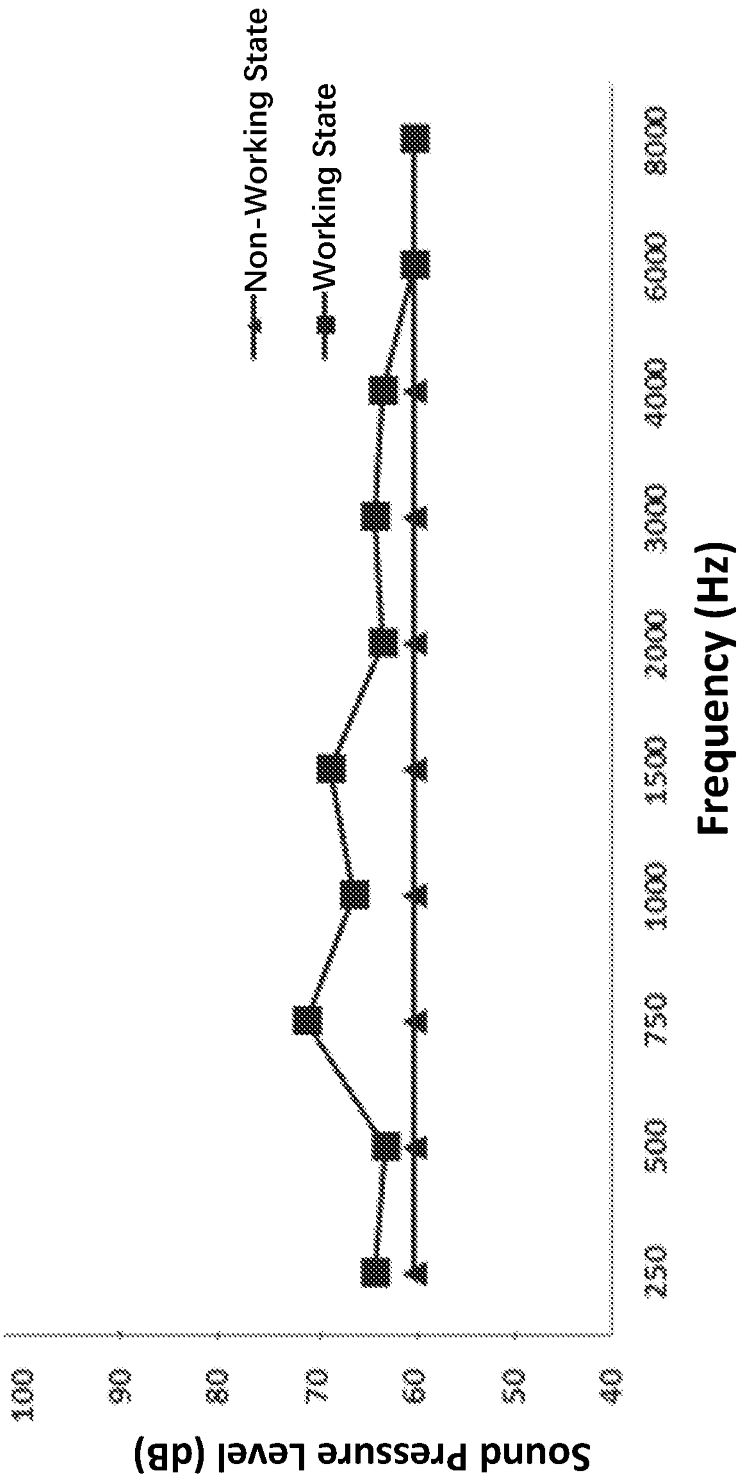
FIG. 6 is a sound pressure level diagram of an air conduction component output by an assistive listening device in a reference environment according to some embodiments of the present disclosure.
Figure 7:
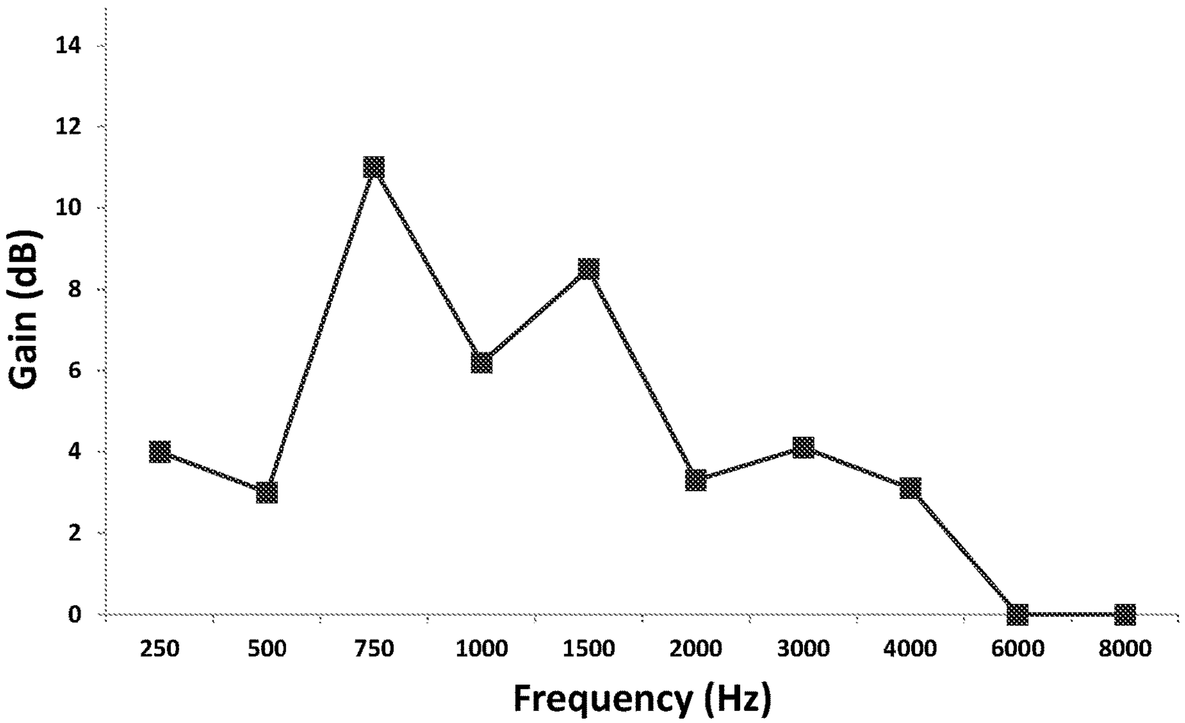
FIG. 7 is a gain diagram of an air conduction component output by an assistive listening device in a reference environment according to some embodiments of the present disclosure.

By testing the output of the air conduction component of the assistive listening device, a sound pressure level diagram and gain diagram of the assistive listening device under the reference sound pressure level in the working and non-working states can be obtained. Specifically, FIG. 6 is a sound pressure level diagram of an air conduction component output by an assistive listening device in a reference environment according to some embodiments of the present disclosure, and FIG. 7 is a gain diagram of an air conduction component output by an assistive listening device in a reference environment according to some embodiments of the present disclosure. In the embodiments of the present disclosure, the gain of the air conduction component may refer to the difference between the sound pressure level of the air conduction component in the working state and the sound pressure level of the air conduction component in the non-working state at each frequency of the assistive listening device. As shown in FIG. 6 and FIG. 7, the assistive listening device is in the non-working state, when the frequency range is within 250 Hz-8000 Hz and the reference sound pressure level is 60 dB, the sound pressure level of the air conduction component tested by the ear simulator inside the artificial head is roughly 60 dB, i.e., the sound pressure level of the air conduction component measured by the ear simulator inside the artificial head is basically equal to the sound pressure level of the test sound source. When the assistive listening device is in the working state, within the frequency range of 250 Hz-6000 Hz, the sound pressure level of the air conduction component tested by the ear simulator inside the artificial head is all greater than 60 dB. When the assistive listening device is in the working state, within the frequency range of 6000 Hz-8000 Hz, the sound pressure level of the air conduction component tested by the ear simulator inside the artificial head is roughly 60 dB. It can be concluded that when the assistive listening device is in the working state and the frequency range is within 250 Hz-6000 Hz, the assistive listening device can generate an air conduction sound wave that is different from the test sound source, the air conduction sound wave can generate the sound intensity higher than the test sound source, thereby improving the air conduction hearing compensation effect of the assistive listening device. In some embodiments, for the sound with the certain reference sound intensity (e.g., 60 dB SPL), it is considered that the gains of the air conduction components of different frequencies are different, the signal processing module 200 may amplify different components of electric signal of different frequencies (or frequency bands) to different degrees. For example, since the gain of the air conduction component around 750 Hz exceeds the gain within other ranges, to further improve the air conduction sound compensation effect of the assistive listening device, the signal processing module 200 may amplify the frequency band component within the 750 Hz range to a greater degree. Or, since the gain of the air conduction component above 6000 Hz is smaller than the gains of the other ranges, to balance the compensation effect of the bone conduction sound of the assistive listening device within the each frequency range, the signal processing module 200 may amplify the frequency band component above the 6000 Hz to a greater degree.

Combined with the contents of FIG. 4-FIG. 7, within the specific frequency range, the bone conduction sound wave and the air conduction sound wave output by the assistive listening device have better hearing compensation effect. For example, when the frequency range is within 250 Hz-8000 Hz, the bone conduction sound wave output by the assistive listening device has a better gain effect relative to the reference sound pressure level. For another example, when the frequency range is within 250 Hz-6000 Hz, the air conduction sound wave output by the assistive listening device has a better gain effect relative to the reference sound pressure level (e.g., 60 dB SPL). To sum up, it can be known that the assistive listening device has a better bone conduction gain and a better air conduction gain within the target frequency range. The target frequency range is within 200 Hz-8000 Hz. Preferably, the target frequency range is within 500 Hz-6000 Hz. More preferably, the target frequency range is 750 Hz-1000 Hz. It should be noted that the sound compensation effects of the bone conduction sound wave and/or the air conduction sound wave can be improved by adjusting the frequency range. For example, within 250 Hz-500 Hz, the sound compensation effect of the bone conduction sound wave is better, but within this frequency band, the sound compensation effect of the air conduction sound wave is poor. In such cases, the electric signal in this frequency band can be amplified by the power amplifier 220 to enhance the sound compensation effect of the bone conduction sound wave within this frequency band. For example, within 3000 Hz-4000 Hz, the sound compensation effect of the air conduction sound wave is better, but within this frequency band, the sound compensation effect of the bone conduction sound wave is poor. In such cases, the electric signal of this frequency band may amplified by the power amplifier 220 to enhance the sound compensation effect of the air conduction sound wave within this frequency band. For another example, within 750 Hz-1500 Hz, the sound compensation effect of both the air conduction sound wave and the bone conduction sound wave are better. In such cases, the electric signal of this frequency band can be amplified by the power amplifier 220 to enhance the sound compensation effect of both the bone conduction sound wave and the air conduction sound wave within this frequency band, and improve the sound compensation effect of the assistive listening device within this frequency band. In the other embodiments, to balance of the hearing effect of the assistive listening device in each frequency band, a power amplification processing may be performed on the signal in frequency bands other than the range within 750 Hz-1500 Hz. In other embodiments, the mass and the elastic coefficient of each part of the first vibration component (e.g., the magnetic circuit system 310, the vibration board 320, the connector 330) can also be adjusted, thereby adjusting the frequency range and the amplitude of the sound transmitted through the air or bone conduction.

In some further embodiments, in order to improve the compensation effect of the assistive listening device in terms of the air conduction sound wave, an extra vibration component may be provided in the assistive listening device. As shown in FIG. 3, in some embodiments, the assistive listening device 10 may further include the at least one second vibration component (not illustrated in figures) configured to generate the extra air conduction sound wave. Within the target frequency range, the extra air conduction sound wave can further enhance the sound intensity of the air conduction sound heard by the user's ears.

In some embodiments, the at least one second vibration component may include a vibration diaphragm structure connected to the shell 350, such that vibration of the first vibration may actuate the component diaphragm structure to generate the extra air conduction sound wave. Specifically, when the vibration board 320 of the output energy converter generates the vibration to generate the bone conduction sound wave, it will also drive the air inside the shell 350 to vibrate and act on the diaphragm structure, the diaphragm structure vibrates with the vibration of the air inside the shell 350, thereby generating the extra air conduction sound wave. The extra air conduction sound wave may be radiated to the outside through at least one sound outlet arranged on the shell 350. The extra air conduction sound wave may be transmitted to the user's ears together with the air conduction sound wave generated by the vibration of the shell 350, thereby further improving the sound intensity of the air conduction sound received by the user.

In some embodiments, a second vibration component may be an air conduction loudspeaker configured to generate the extra air conduction sound wave according to the control signal. The extra air conduction sound wave emitted by the air conduction loudspeaker may further be radiated to the outside through the at least one sound outlet arranged on the shell 350. In some embodiments, when the user wears the assistive listening device, the at least one sound outlet is close to the human ear. In some embodiments, the control signal that controls the air conduction loudspeaker may or may not be the same as the control signal that controls the output energy converter. For example, when the control signal that controls the air conduction loudspeaker is the same as the control signal that controls the output energy converter, the air conduction speaker may supplement the assistive listening device with the sound wave within the same frequency range as the output energy converter, thereby improving the hearing effect within this frequency range. For another example, when the control signal that controls the air conduction loudspeaker is different from the control signal that controls the output energy converter, the air conduction loudspeaker may supplement the assistive listening device with the sound wave within a different frequency range from the output energy converter, thereby making up for the hearing effect of the assistive listening device within the other frequency range.

Figure 8:
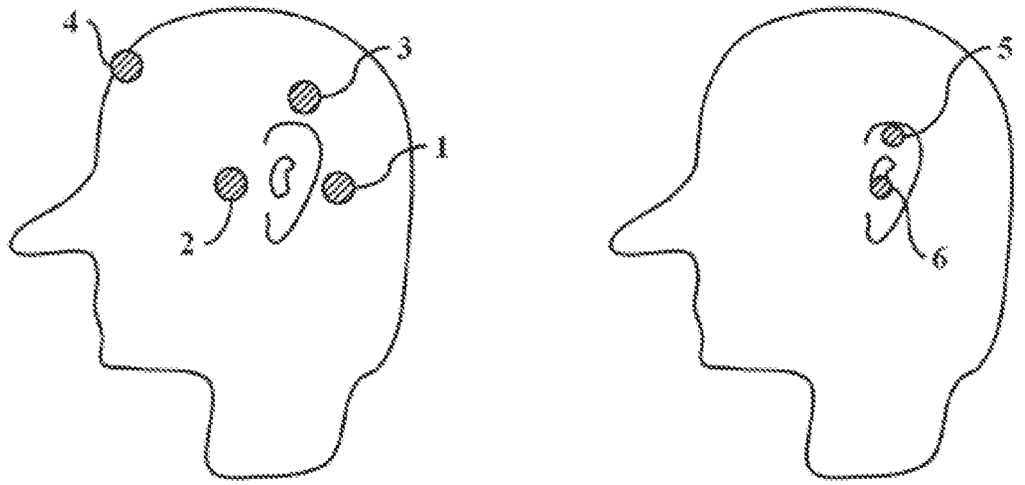
FIG. 8 is a position distribution diagram of an assistive listening device when it is in a wearing state.

In some embodiments, the assistive listening device may further include a fixed structure configured to support the assistive listening device, such that the assistive listening device (a shaded area in FIG. 8) may be located at a vicinity of a mastoid 1, a temporal bone 2, a parietal bone 3, a frontal bone 4, a auricle 5, a concha 6 or an ear canal (not illustrated in figures) of the user's head as shown in FIG. 8. In other embodiments, the assistive listening device may further be located at other regions of the user's head, which is not further limited herein.

In some embodiments, the assistive listening device may be integrated with products such as glasses, headsets, head-mounted displays, AR/VR headsets, etc. In such cases, the fixed structure may be a component of the above products (e.g., a connector). The assistive listening device may be hung or clamped in the vicinity of the user's ear. In some alternative embodiments, the fixed structure may be a hook, and a shape of the hook matches the shape of a pinna, so that the assistive listening device can be independently worn on the user's ear through the hook. Multiple assistive listening devices that are worn independently may communicate with a signal source (e.g., a computer, a cell phone, or other mobile devices) in a wired or wireless (e.g., Bluetooth) manner. For example, the assistive listening devices at the left and right ears may both be wirelessly connected to the signal source in a direct communication. For another example, the assistive listening devices at the left and right ears may include a first output device and a second output device, the first output device may be connected in communication with the signal source, and the second output device may be wirelessly connected with the first output device in a wireless manner, and a synchronization of audio playback between the first output device and the second output device may be realized through one or more synchronization signals. The method of wireless connection may include but is not limited to Bluetooth, local area network, wide area network, wireless personal area network, near field communication, etc. or any combination thereof.

In some embodiments, the fixed structure may be a shell structure with a shape adapted to the human ear, such as a circular ring, oval, polygon (regular or irregular), U-shaped, V-shaped, semicircular, such that the fixed structure may be directly attached to the user's ears. The target frequency range is within 200 Hz-8000 Hz. In some embodiments, the fixed structure may include an ear hook, a head beam, or an elastic band, etc., such that the assistive listening device can be better fixed on the user and prevent the assistive listening device from falling during use. Merely by way of example, the elastic band may be a headband configured to be worn around the head area. In some embodiments, the elastic band may be a continuous band and elastically stretched to fit over the user's head, at the same time, the elastic band can also exert pressure on the user's head, so that the assistive listening device is firmly fixed on a specific position of the user's head. In some embodiments, the elastic band may be a discontinuous band. For example, the elastic band may include a rigid portion and a flexible portion, the rigid portion may be made of rigid material (e.g., plastic or metal), and the rigid part may be fixed by a physical connection (e.g., a snap-fit, a screw connection, etc.) to the shell of the assistive listening device. The flexible portion may be made of elastic material (e.g., cloth, composite, and/or neoprene).

The basic concepts have been described. Obviously, for those skilled in the art, the detailed disclosure may be only an example and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of the present disclosure are not necessarily all referring to the same embodiment. In addition, some features, structures, or features in the present disclosure of one or more embodiments may be appropriately combined.

In addition, those skilled in the art can understand that various aspects of the present disclosure can be illustrated and described through several patentable categories or situations, including any new and useful processes, machines, products, or combinations of materials, or any new and useful improvements. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". In addition, aspects of the present disclosure may appear as a computer product located in one or more computer-readable media, the product including computer-readable program code.

The computer storage medium may include a propagation data signal containing a computer program encoding, such as on a baseband or as part of a carrier. The propagation signal may have a variety of expressions, including electromagnetic form, optical form, or suitable combination form. The computer storage medium can be any computer-readable medium other than the computer-readable storage medium, which can be used to perform systems, devices, or devices to implement communication, propagating, or devices by connecting to an instruction. The program code located on the computer storage medium may be propagated through any suitable medium, including radio, cable, fiber optic cable, RF, or similar media, or any combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer, partly on a remote computer, or entirely on the remote computer or server. In the case of subsequent cases, the remote computer can be connected to the user computer through any network, such as a local area network (LAN) or a wide area network (WAN), or connected to an external computer (e.g., through the Internet), or in the cloud computing environment, or as a service Use Software, SaaS.

Moreover, unless otherwise specified in the claims, the sequence of the processing elements and sequences of the present disclosure, the use of digital letters, or other names are not used to define the order of the application flow and methods. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Correspondingly, in some embodiments, the value parameters used in the present disclosure and claims are approximate values. The approximate values may be changed according to the characteristics of individual embodiments. In some embodiments, the numerical parameters should be construed in light of the number of reported significant digits and by applying ordinary rounding techniques. Although the numerical domains and parameters used in the present application are used to confirm the range of ranges, the settings of this type are as accurate in the feasible range within the feasible range in the specific embodiments.

For each patent, patent application, patent application publication, and other materials cited in the present disclosure, such as articles, books, specifications, publications, documents, etc., the entire contents are hereby incorporated by reference into the present disclosure. Except for application history documents that are inconsistent with or conflict with the contents of the present disclosure, the documents with the most limited scope of the claims of the present disclosure (current or later appended to the present disclosure) are also excluded. It should be noted that if the description, definition, and/or terms used in the appended application of the present disclosure are inconsistent or conflicting with the content described in the present disclosure, the use of the description, definition, and/or terms of the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, the embodiments of the present disclosure are not limited to that precisely as shown and described.

What is claimed is:

1. An assistive listening device, comprising:

a signal input module configured to receive an initial sound and convert the initial sound into an electric signal;

a signal processing module configured to process the electric signal and generate a control signal; and at least one output energy converter configured to convert the control signal into a bone conduction sound wave that can be perceived by a user and an air conduction sound wave that can be heard by the user's ears, wherein within a target frequency range, the air conduction sound wave is transmitted to the user's ears, so that a sound intensity of the air conduction sound heard by the user's ears is greater than a sound intensity of the initial sound received by the signal input module, wherein each of the at least one output energy converter comprises:

a first vibration component electrically connected to the signal processing module and configured to receive the control signal and generate the bone conduction sound wave based on the control signal, and a shell coupled with the first vibration component and configured to generate, driven by the first vibration component, the air conduction sound wave.

2. The assistive listening device of claim 1, wherein the target frequency range is 200 Hz-8000 Hz.

3. The assistive listening device of claim 1, wherein the target frequency range is 500 Hz-6000 Hz.

4. The assistive listening device of claim 1, wherein the target frequency range is 750 Hz-1000 Hz.

5. The assistive listening device of claim 1, wherein the signal processing module includes a signal processing unit, and the signal processing unit includes:

a frequency division module configured to decompose the electric signal into a high-frequency band component and a low-frequency band component;

a high-frequency signal processing module coupled to the frequency division module and configured to generate a high-frequency output signal based on the high-frequency band component; and a low-frequency signal processing module coupled to the frequency division module and configured to generate a low-frequency output signal based on the low-frequency band component.

6. The assistive listening device of claim 1, wherein the electric signal includes a high-frequency output signal corresponding to a high-frequency band component of the initial sound and a low-frequency output signal corresponding to a low-frequency band component of the initial sound, the signal processing unit includes:

a high-frequency signal processing module configured to generate the high-frequency output signal according to the high-frequency band component; and a low-frequency signal processing module configured to generate the low-frequency output signal according to the low-frequency band component.

7. The assistive listening device of claim 5, wherein the signal processing module further includes a power amplifier configured to amplify the high-frequency output signal or the low-frequency output signal to generate the control signal.

8. The assistive listening device of claim 1, wherein a connection between the shell and the first vibration component includes a rigid connection.

9. The assistive listening device of claim 1, wherein the shell is connected to the first vibration component through an elastic component.

10. The sound output device of claim 9, wherein the first vibration component includes:

a magnetic circuit configured to generate a first magnetic field;

a vibration board connected to the shell; and a coil connected to the vibration board and electrically connected to the signal processing module, wherein the coil is configured to receive the control signal and generate a second magnetic field based on the control signal, and an interaction between the first magnetic field and the second magnetic field drives the vibration board to generate the bone conduction sound wave.

11. The assistive listening device of claim 10, wherein the vibration board and the shell form a cavity, the magnetic circuit is located in the cavity, and the magnetic circuit is connected to the shell through the elastic component.

12. The assistive listening device of claim 1, wherein a vibration output force level corresponding to the bone conduction sound wave is greater than 55 dB.

13. The assistive listening device of claim 1, further comprising at least one second vibration component configured to generate an extra air conduction sound wave, and the extra air conduction sound wave enhances the sound intensity of the air conduction sound heard by the user's ears within the target frequency range.

14. The assistive listening device of claim 13, wherein the at least one second vibration component includes a vibration diaphragm structure connected to the shell, and the at least one output energy converter actuates the vibration diaphragm structure to generate the extra air conduction sound wave.

15. The assistive listening device of claim 13, wherein the at least one second vibration component includes an air conduction loudspeaker configured to generate the extra air conduction sound wave according to the control signal.

16. The assistive listening device of claim 1, further comprising a fixed structure configured to support the assistive listening device, such that the assistive listening device is located at at least one of a mastoid, a temporal bone, a parietal bone, a frontal bone, an auricle, an ear canal, or a concha of the user's head.

17. An assistive listening device, comprising:

a signal input module configured to receive an initial sound and convert the initial sound into an electric signal;

a signal processing module configured to process the electric signal and generate a control signal; and at least one output energy converter configured to convert the control signal into a bone conduction sound wave that can be perceived by a user and an air conduction sound wave that can be heard by the user's ears, wherein the assistive listening device comprises a working state and a non-working state, the assistive listening device generates the air conduction sound wave when it is in the working state, the assistive listening device does not generate the air conduction sound wave when it is in the non-working state, and within a target frequency range, a sound intensity of an air conduction sound heard by the user's ears when the assistive listening device is in the working state is greater than an air conduction sound heard by the user's ears when the assistive listening device is in the non-working state.

18. The assistive listening device of claim 17, wherein the signal processing module includes a signal processing unit, and the signal processing unit includes:

a frequency division module configured to decompose the electric signal into a high-frequency band component and a low-frequency band component;

a high-frequency signal processing module coupled to the frequency division module and configured to generate a high-frequency output signal based on the high-frequency band component; and a low-frequency signal processing module coupled to the frequency division module and configured to generate a low-frequency output signal based on the low-frequency band component.

19. The assistive listening device of claim 17, wherein the electric signal includes a high-frequency output signal corresponding to a high-frequency band component of the initial sound and a low-frequency output signal corresponding to a low-frequency band component of the initial sound, the signal processing unit includes:

a high-frequency signal processing module configured to generate the high-frequency output signal according to the high-frequency band component; and a low-frequency signal processing module configured to generate the low-frequency output signal according to the low-frequency band component.

* * * * *